(12) United States Patent
Qadri et al.

(10) Patent No.: US 10,472,245 B2
(45) Date of Patent: Nov. 12, 2019

(54) SYNTHESIS OF NANOSTRUCTURED ZINC SILICATE FROM RENEWABLE SOURCES

(71) Applicant: The Government of the United States of America, as represented by the Secretary of the Navy, Arlington, VA (US)

(72) Inventors: Syed B. Qadri, Fairfax Station, VA (US); Bhakta B. Rath, Oakton, VA (US); Edward P. Gorzkowski, III, Odenton, MD (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 137 days.

(21) Appl. No.: 15/786,245

(22) Filed: Oct. 17, 2017

(65) Prior Publication Data

US 2018/0134569 A1 May 17, 2018

Related U.S. Application Data

(60) Provisional application No. 62/422,811, filed on Nov. 16, 2016.

(51) Int. Cl.
*C01B 33/20* (2006.01)

(52) U.S. Cl.
CPC .......... *C01B 33/20* (2013.01); *C01P 2002/01* (2013.01)

(58) Field of Classification Search
CPC ..................................... C01B 33/20
See application file for complete search history.

(56) References Cited

U.S. PATENT DOCUMENTS

| 4,681,749 A * | 7/1987 | Usui | B41M 5/1555 106/431 |
| 7,901,651 B2 * | 3/2011 | Hong | C09K 11/595 423/324 |

\* cited by examiner

*Primary Examiner* — Stuart L Hendrickson
(74) *Attorney, Agent, or Firm* — US Naval Research Laboratory; Stephen T. Hunnius

(57) ABSTRACT

A method of making Nanostructured Zinc Silicate from renewable sources comprising preparing powders of husks, preparing powders of ZnO, mixing the powders of husks and the powders of ZnO and forming a homogenous sample powder, pressing the homogenous sample and forming pellets, heating the pellets and forming nanostructured zinc silicate. The nanostructured zinc silicate from renewable sources product of the process of preparing powders of husks, preparing powders of ZnO, mixing the powders of husks and the powders of ZnO and forming a homogenous sample powder, pressing the homogenous sample and forming pellets, heating the pellets and forming nanostructured zinc silicate.

7 Claims, 6 Drawing Sheets

SYNTHESIS OF NANOSTRUCTURED ZINC SILICATE FROM RENEWABLE SOURCES

REFERENCE TO RELATED APPLICATION

This application is a non-provisional of, and claims priority to and the benefits of, U.S. Patent Application No. 62/422,811 filed on Nov. 16, 2016, the entirety of which is hereby incorporated by reference.

BACKGROUND

This invention concerns a new method for the formation of abundant quantities of Zinc Silicate from a thermal treatment of a mixture of aluminum oxide zinc oxide and rice or wheat husks in an argon atmosphere.

Zinc silicate ($Zn_2SiO_4$) is an important chemical compound with many industrial applications. It is used as an additive to serve as an anticaking agent for selected types of foods; it is widely used as anticorrosion coatings for ships, buildings, and vessels that are exposed to high levels of saltwater. Additionally, in these types of applications, zinc silicate is used as a primer for the paint that is applied to the surfaces.

Zinc silicate, a semiconductor material with a wide band gap of 4.1 eV, is used as a scintillating material in cathode ray tubes and fluorescent electronic devices. Manganese doped $Zn_2SiO_4$ is an efficient green emitting phosphor and is extensively used in fluorescent lamps, and plasma display panels [Yang et al., 2005; Morell et al., 1993; Barthou et al., 1994; Rack et al., 1997; Copeland et al., 2002; Thioulouse et al., 1982]. Mn-doped zinc silicate ($Zn_2SiO_4:Mn_2^+$), has been used as a phosphor in fluorescent lamps, neon discharge lamps, oscilloscopes, black-and-white and color televisions, and many other displays and lighting devices for a long time [Harrison et al., 1960; Ronda et al., 1997; Minami et al., 2003; Feldmann et al., 2003; Zhang et al., 2006].

At present, $Zn_2SiO_4:Mn^{2+}$ is consumed in high volume for the most advanced televisions; plasma display panels (PDPs), due to its high luminescence efficiency, high color purity, highly chemical and thermal stabilities [Zhang et al., 2006; Liang et al., 2007].

There are two commercial processes for synthesizing zinc silicate. One consists of a solid state reaction at high temperature to produce large pieces of zinc silicate followed by ball milling and grinding to obtain desired powder [Stever et al., 1974]. The other is a wet-chemistry multistep process to produce the powder product [Schulman et al., 1946]. Both processes are time consuming and cost intensive.

Rice and wheat husks are available in abundance as agriculture residues around the world. Rice husk (RH) and wheat husk (WH) have high C and Si contents, so they can be used as a low-cost Si and C sources for synthesizing advanced materials. When WH and RH are burned at a certain temperature in air, carbon and other elements are released leaving silicon dioxide ($SiO_2$) as the major component of the end product known as rice husk ash (RHA) or wheat husk ash (WHA). Recently Xiong et al. showed using a multistep process, that $SiO_2$ extracted from RHA can be utilized and mixed with Zinc Oxide (ZnO) to produce $Zn_2SiO_4$ and when doped with Mn2+ results in an efficient phosphor material. The following equation describes the solid state reaction that will result in zinc silicate:

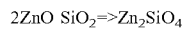

$2ZnO\ SiO_2 => Zn_2SiO_4$

In addition to phosphor characteristics of zinc silicate, it has been shown that nano-rod like structures of $Zn_2SiO_4$ are capable of adsorbing heavy metals such as Fe, Cd, Hg and Pb in water [Wang et al., 2012]. With these findings, there is added incentive to study the properties and performance of $Zn_2SiO_4$ and its applicability of purifying water by removing heavy metals.

Previous work on agriculture residues has shown successful conversion of rice husks, wheat husks, sorghum leaves, and corn leaves into silicon carbide (SiC) and $Si_3N_4$ by pyrolyzing in argon atmosphere or in nitrogen atmospheres respectively [Gorzkowski et al., 2013; Qadri et al., 2012; Qadri et al., 2013; Qadri et al., 2013; Qadri et al., 2015; Qadri et al., 2013; Qadri et al., 2015].

Importantly, this type of synthesis involves a single step process in which no additives are involved. This disclosure focuses on producing nanoparticles of $Zn_2SiO_4$ from wheat and rice husks by adding ZnO in the correct weight ratio with $SiO_2$ that is inherently present in these agriculture residues.

This process does not produce RHA or WHA, but rather uses the natural content of $SiO_2$ present in RH or WH.

The carbon content acts as catalyst in the solid state reaction and the remaining carbon present in the sample can be removed by heating at an appropriate temperature in air. The structural parameters and composition of the produced $Zn_2SiO_4$ are investigated using x-ray diffraction (XRD) and Raman scattering spectroscopy. In addition, transmission electron microscopy results are presented to obtain the size and shapes of the nanocrystals of zinc silicates.

The phosphor characteristics were determined in-situ by using x-rays of 8 keV coupled with an optical spectrometer, and room temperature photoluminescence (PL) and PL imaging.

Billions of pounds of agricultural waste, such as rice and wheat husks, are generated every year all over the world. Zinc Silicate is a very useful material for industrial applications due to its unique physical properties. Examples of uses include but are not limited to an additive as an anticaking agent for selected types of food, excellent anticorrosion coatings for ships, buildings, and vessels exposed to high levels of salt water, a primer for the paint that is applied to the surfaces, a fluorescent and phosphorescent material for wavelength between x-rays and UV light and as a scintillating material in cathode ray tubes and fluorescent electronic devices.

Here, Zinc Silicate is synthesized from wheat and rice husks or other husks using conventional heating or microwave heating to produce nano-structures previously unseen.

SUMMARY OF DISCLOSURE

Description

A method of making abundant quantities of Zinc Silicate from a thermal treatment of a mixture of aluminum oxide zinc oxide and rice or wheat husks or other husks in an argon atmosphere.

DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings.

DETAILED DESCRIPTION OF THE INVENTION

Figure 1:
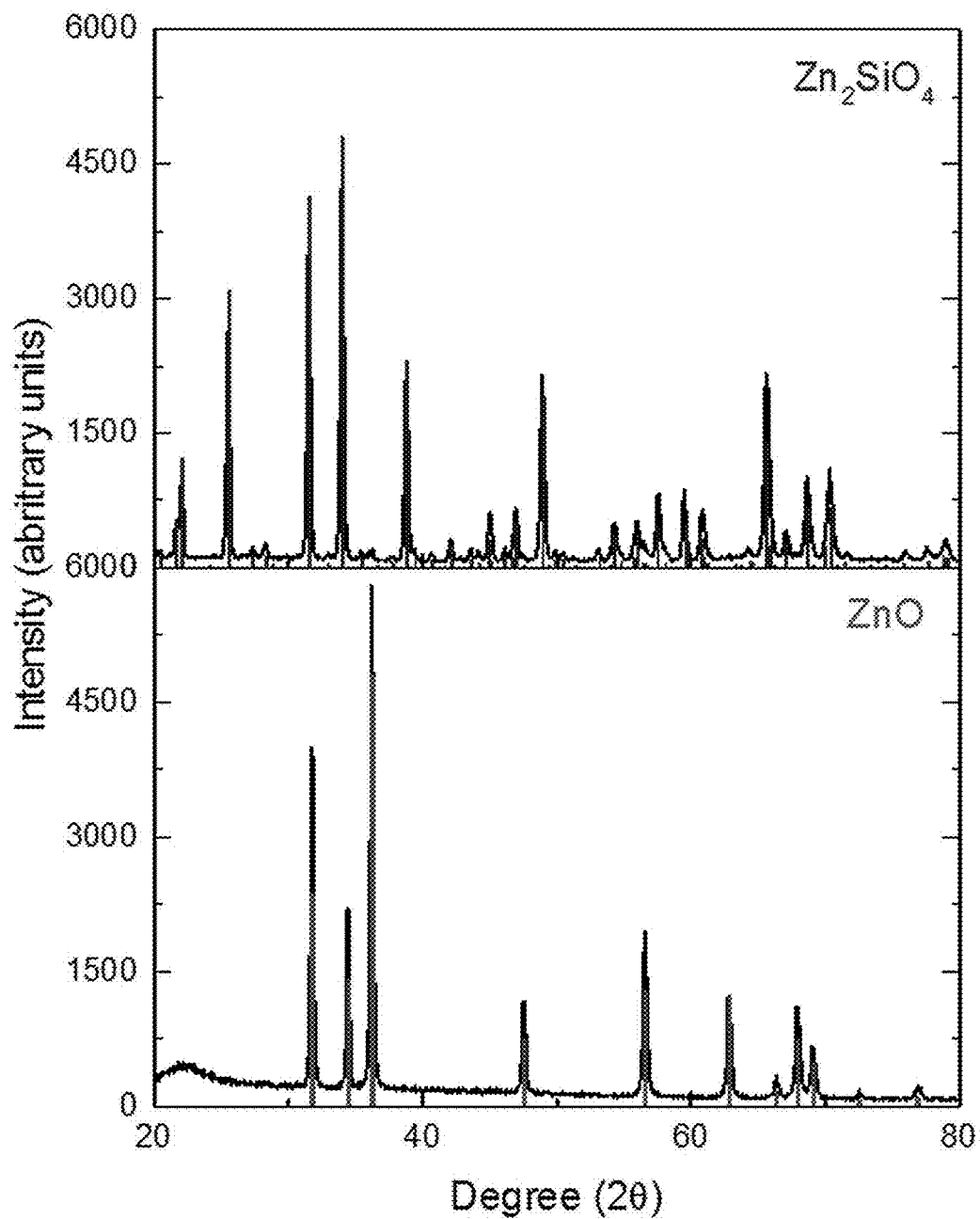
FIG. 1 illustrates an overlay of X-ray diffraction patterns taken with CuKα radiation of as-received wheat husk plus zinc oxide (lower half) and the processed sample showing the diffraction pattern of $Zn_2SiO_4$ (upper half).
Figure 2:
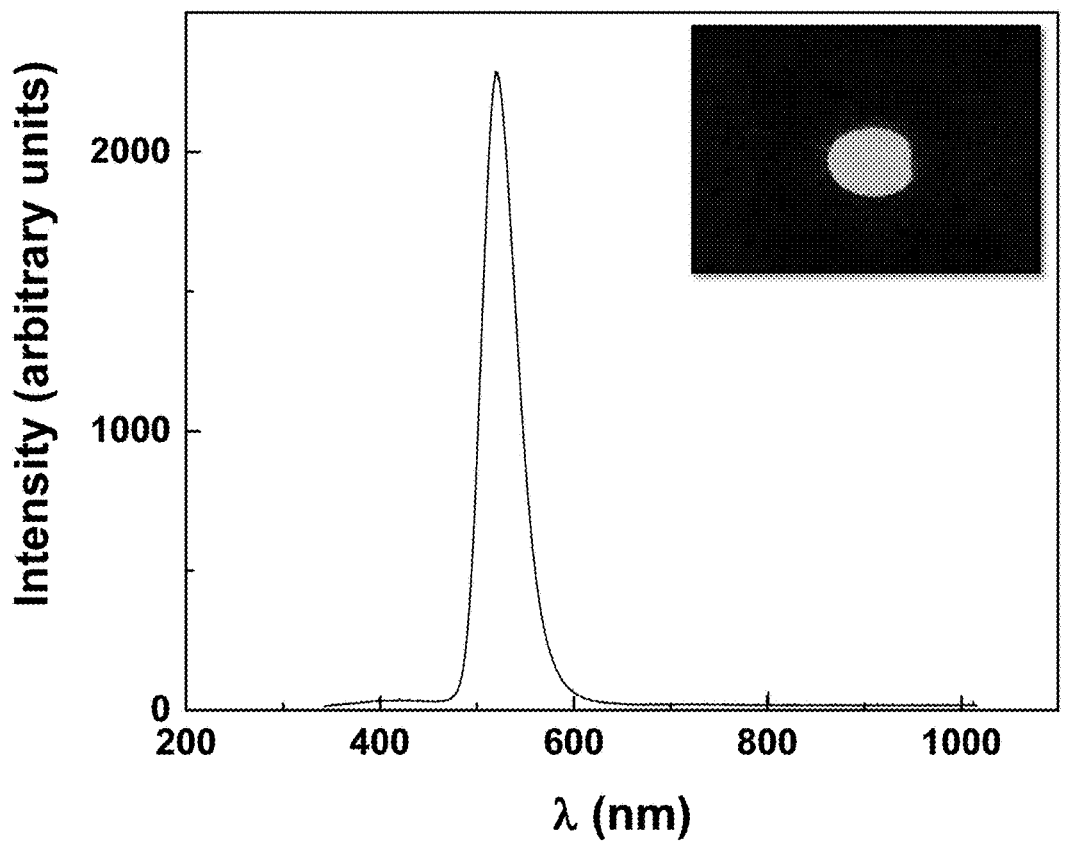
FIG. 2 illustrates X-Ray excited optical spectra of the $Zn_2SiO_4$ synthesized from wheat husk showing green light emission of 532 nm.
Figure 3:
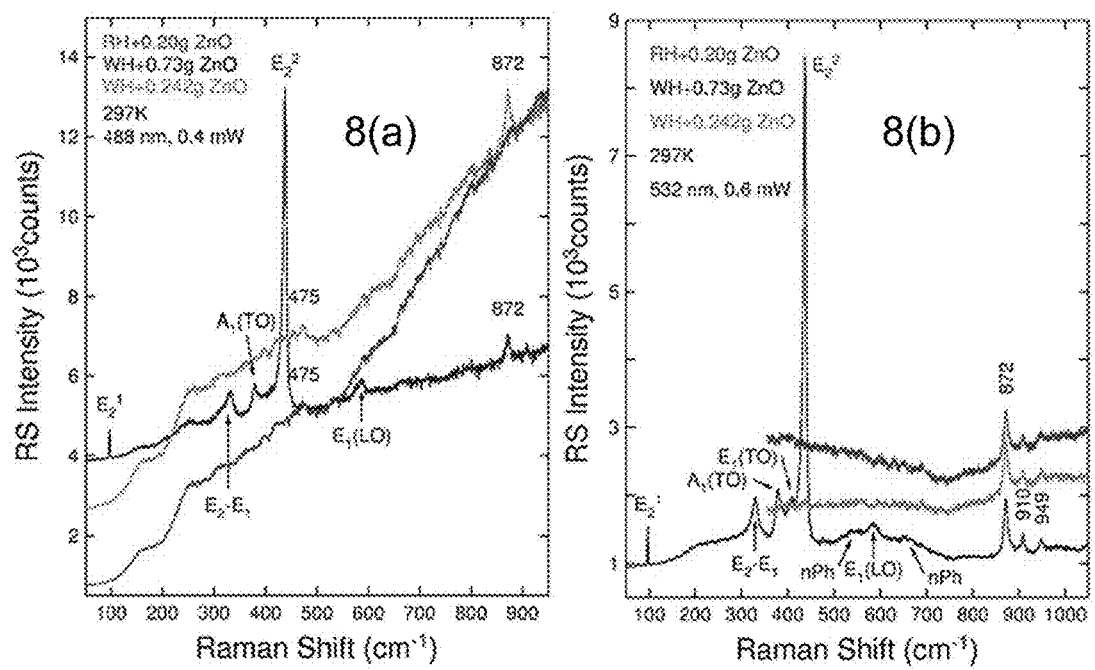
FIG. 3 illustrates room temperature Raman spectra of one RH sample and two WH samples acquired with the 488 nm laser line. Despite the large luminescence background, sharp lines associated to optical phonon modes are observed. Only the phonon lines at 475 and 872 cm$^{-1}$ are not associated with ZnO nanocrystals.
Figure 4:
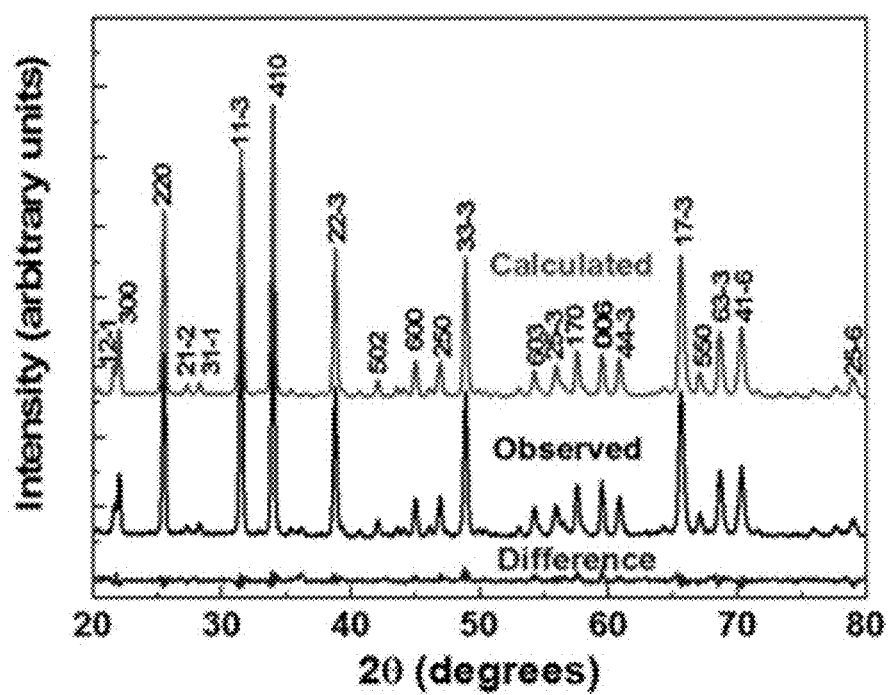
FIG. 4 illustrates Rietveld Analysis (Phase Purity Observation) Intensity vs. Degrees.
Figure 5:
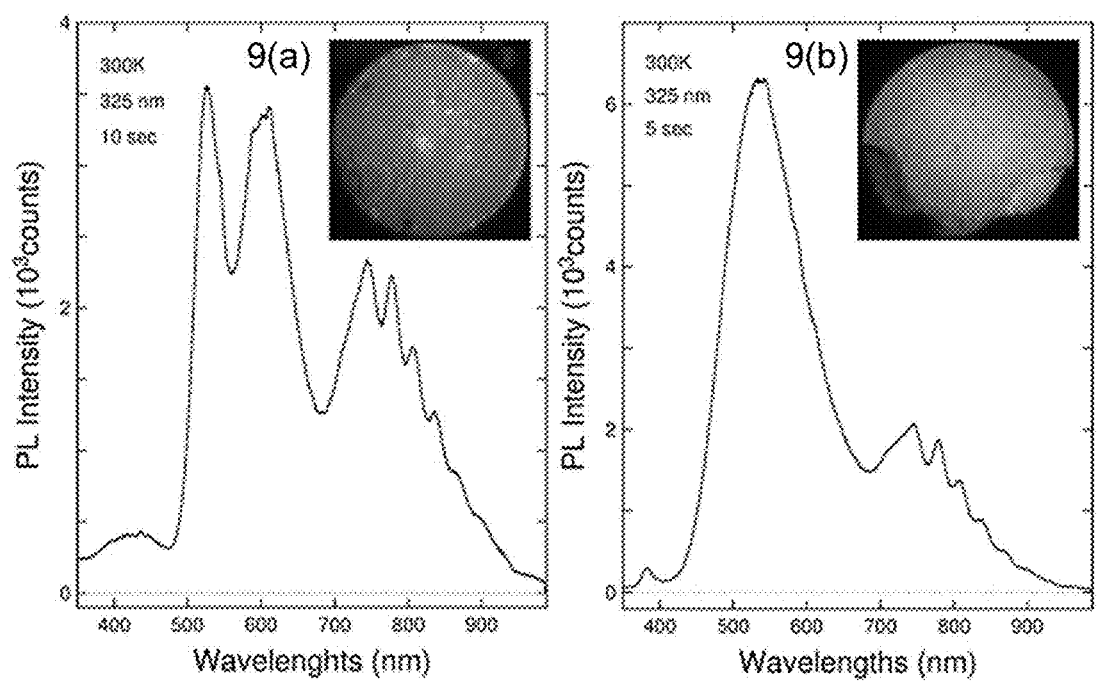
FIG. 5 illustrates room temperature Photo Luminescence spectrum of the Rice Husk sample after thermal treatment, acquired with 10 sec integration time.
Figure 6:
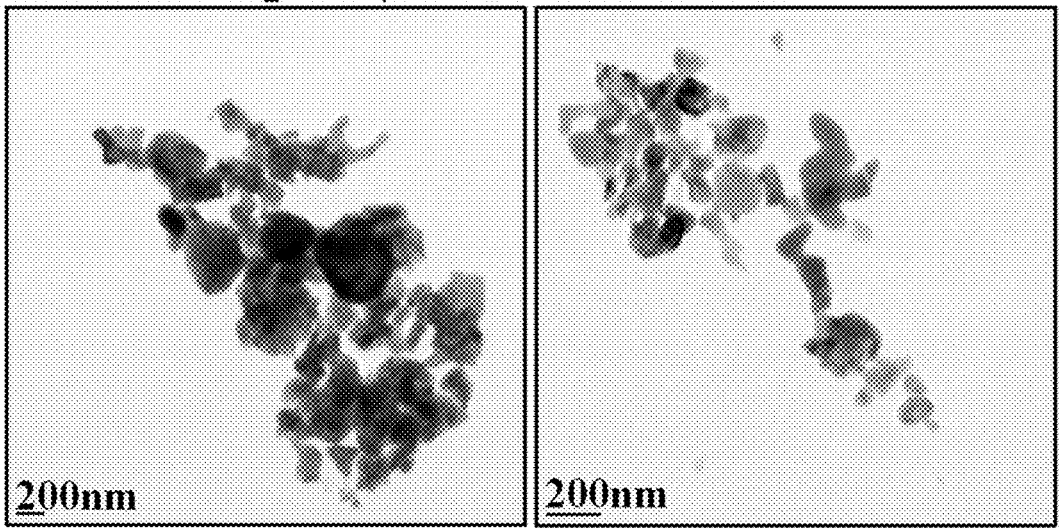
FIG. 6 illustrates TEM micrographs of $Zn_2SiO_4$ samples derived from wheat husks and rice husks showing nanoparticles of 50-100 nm.
Figure 6:
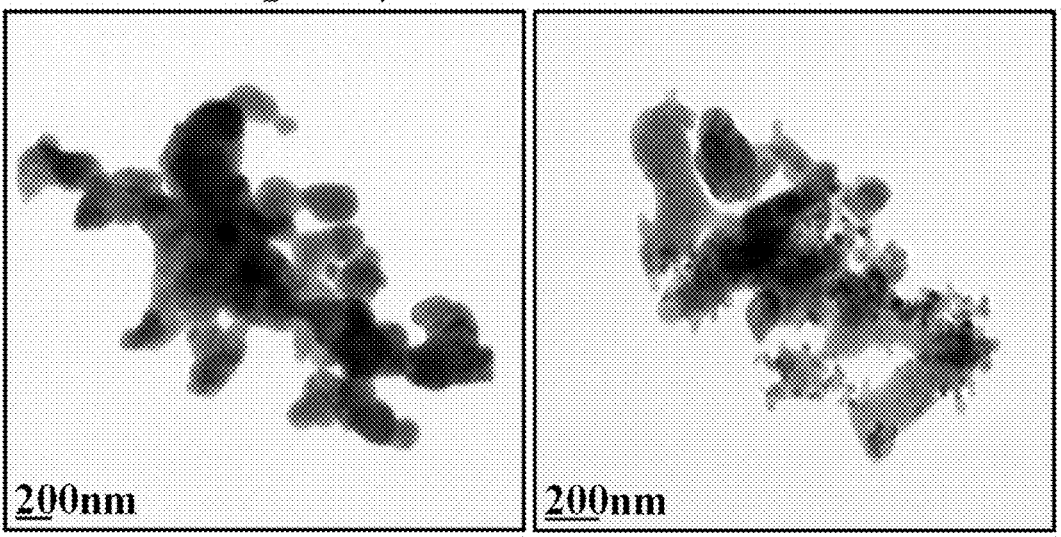

This invention concerns a new method for the formation of abundant quantities of Zinc Silicate from a thermal treatment of a mixture of aluminum oxide zinc oxide and rice or wheat husks in an argon atmosphere at temperatures in excess of 1450° C.

Here, the inventors discovered the formation of pure $Zn_2SiO_4$ by carbothermal reduction of ZnO with rice and wheat husks in the presence of an Ar atmosphere to produce nano-tubes and nanoparticles in a graphite boat then purified in an $O_2$ atmosphere in an $Al_2O_3$ crucible.

No additives/dopants were added to enhance the scintillating properties. The product was naturally scintillating.

Example 1

It was determined that the presence of crystalline phases of $SiO_2$ was found to have a weight percentage of 16% for the rice husk and 14% for the wheat husks. The appropriate ratios were weighed out and the ZnO and wheat or rice husks mixtures were thoroughly mixed and pulverized using ball milling which produced a very homogenous fine powder.

The fine powder was pressed into disks having diameter of 1 cms and 2-3 mm thickness using the hydraulic press.

The pellets were heat treated in a conventional furnace at temperatures above 1400° C. in an argon atmosphere for a period of 2-4 hours and subsequently treated in air at 650° C. to remove the excess carbon.

Example 2

Samples were made from raw wheat and rice husks after thoroughly washing in distilled water and mixed with ZnO powder in the appropriate weight ratios to produce 1 gm of zinc silicate.

By weighing the wheat and rice samples before and after heat treatment in air and using x-ray diffraction scans, the presence of crystalline phases of $SiO_2$ was found to have a weight percentage of 16% for the rice husk and 14% for the wheat husks.

It took 0.242 gm of ZnO and 1.54 gms of wheat husk to produce 1 gram of $Zn_2SiO_4$, whereas it took only 0.20 grams of ZnO and 1.54 grams of rice husks to produce 1 gram of $Zn_2SiO_4$.

Example 3

The ZnO and wheat or rice husks mixtures were thoroughly mixed and pulverized using ball milling which produced a very homogenous fine powder.

The fine powder was pressed into disks having diameter of 1 cms and 2-3 mm thickness using the hydraulic press.

The pellets were heat treated in conventional furnace at temperatures above 1400° C. in an argon atmosphere for a period of 2-4 hours and subsequently treated in air at 650° C. to remove the excess carbon.

The mixed samples were then pulverized into powder using a SPEX 8000M high energy mill with stainless steel milling media.

Pellet samples of 1 cm diameter were prepared again from the reaction product.

Example 4

The samples in the form of pellets were heated in an argon atmosphere using a conventional tube furnace to a temperature between 1400-1500° C.

The processed samples were characterized using x-ray diffraction, Raman scattering and photoluminescence spectroscopy, and electron microscopy techniques.

X-ray diffraction profiles were collected using a Rigaku 18 kW generator and a high resolution powder diffractometer. Monochromatic CuKα radiation was used for all x-ray diffraction scans.

Example 5

Optical emission spectra were collected during X-ray irradiation using a USB2000 Ocean Optics spectrometer equipped with a fiber optic probe with a 1000 μm core. The fiber optic probe was positioned perpendicularly ~2 mm from the sample surface while the X-ray incident angle was 45 degrees.

Example 6

For TEM analysis, the pyrolyzed sample was added to ethyl alcohol and the mixture was placed in the ultrasonic cleaner for a period of time. A carbon coated 200 mesh copper grid was immersed in the mixture to pick up the $Zn_2SiO_4$ powder samples. The specimens were examined in a FEI Tecnai G2 TEM operated at 300 kV.

A home-built confocal micro-Raman spectrometer, comprised of a single-mode 488 nm and 532 nm lasers, a half meter Acton spectrometer with an 1800 groove/mm holographic grating, and a Princeton Instruments back-thinned, deep depleted, Nitrogen cooled CCD (1340×400 pixel array) was employed to verify the samples structural and composition properties. The spectral resolution of this configuration of the system is 2.5 cm$^{-1}$, and the repeatability with which a line position can be determined is within 0.1 cm$^{-1}$. Neutral density filters were employed to control the laser power. Samples were mounted on a precision, computer-controlled Aerotech XYZ translator having a bi-directional position accuracy of better than 0.1 μm. Raman spectra and the incident and reflected laser power were measured and stored for each position in each spatial map.

The room temperature PL spectra were acquired with a small UV-enhanced CCD fiber optical spectrometer covering the UV-NIR spectral region. The samples were excited with the 325 nm line of a HeCd laser, and low power density (only ~64 mW/cm$^{-2}$) was employed to prevent sample heating and luminescence bleaching and/or saturation. Real color and monochromatic luminescence imaging of the samples, under 325 nm laser line excitation, were acquired with a home built luminescence imaging set up.

There are many advantages with the current invention.

These include No additives/dopants are added to enhance the scintillating properties and the product is naturally scintillating, unlike conventional methods of producing zinc silicate.

This process can also be used to make other silicates that can be used for scintillators and other detectors.

This invention will serve to protect Navy vessels operating in salt water due to its anticorrosion properties. The Navy can reduce costs by using this invention to create low-cost high value zinc silicate.

Scintillators are used by DHS radiation detectors. Scintillators can also be used in particle detectors, new energy resource exploration, X-ray security, nuclear cameras, computed tomography and gas exploration. Other applications of scintillators include CT scanners and gamma cameras in medical diagnostics, and screens in older style CRT computer monitors and television sets.

This invention described here is a single step process without any additives to enhance scintillating properties.

This invention pushes the Navy to more environmentally greener processes.

This new process should become the standard processing route for Zinc Silicate.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What we claim is:

1. A method of making Nanostructured Zinc Silicate from renewable sources comprising:
   preparing powders of husks wherein the husks are selected from the group consisting of wheat husk, rice husk, and a combination of wheat husk and rice husk using ball milling including stainless steel milling media;
   preparing powders of ZnO using ball milling including stainless steel milling media;
   mixing the powders of husks and the powders of ZnO using ball milling including stainless steel milling media and thereby forming a homogenous sample powder;
   pressing the homogenous sample powder into disks having a diameter of 1 cm and thickness of 2-3 mm and forming pellets;
   heating the pellets at a temperature above 1400° C. and forming nanostructured zinc silicate pellets of 50-100 nm; and
   removing excess carbon by processing the nanostructured zinc silicate pellets in air at a temperature of 650° C.

2. The method of making Nanostructured Zinc Silicate from renewable sources of claim 1 further comprising the steps of
   washing the husks in distilled water prior to the step of preparing powders of husks wherein the husks are selected from the group consisting of wheat husk, rice husk, and a combination of wheat husk and rice husk using ball milling including stainless steel milling media and
   utilizing a hydraulic press for the step of pressing the homogenous sample powder into disks.

3. The method of making Nanostructured Zinc Silicate from renewable sources of claim 1
   wherein the step of heating the pellets at a temperature above 1400° C. and forming nanostructured zinc silicate pellets of 50-100 nm comprises heat treating in a furnace at temperatures above 1400° C. in an argon atmosphere.

4. The method of making Nanostructured Zinc Silicate from renewable sources of claim 1
   wherein the step of heating the pellets at a temperature above 1400° C. and forming nanostructured zinc silicate pellets of 50-100 nm comprises heat treating in a furnace at temperatures above 1400° C. in an argon atmosphere for a period of 2-4 hours.

5. The method of making Nanostructured Zinc Silicate from renewable sources of claim 1
   wherein the step of heating the pellets at a temperature above 1400° C. and forming nanostructured zinc silicate pellets comprises temperatures between 1400-1500° C. and comprises an argon atmosphere and using a tube furnace.

6. The method of making Nanostructured Zinc Silicate from renewable sources of claim 1
   wherein the step of preparing powders of husks wherein the husks are selected from the group consisting of wheat husk, rice husk, and a combination of wheat husk and rice husk using ball milling including stainless steel milling media comprises 1.54 grams of wheat husk;
   wherein the step of preparing powders of ZnO using ball milling including stainless steel milling media comprises 0.242 grams of ZnO; and
   wherein the steps of heating the pellets at a temperature above 1400° C. and forming nanostructured zinc silicate pellets of 50-100 nm comprises forming pellets of 1 gram of homogenous nanostructured $Zn_2SiO_4$.

7. The method of making Nanostructured Zinc Silicate from renewable sources of claim 1
   wherein the step of preparing powders of husks wherein the husks are selected from the group consisting of wheat husk, rice husk, and a combination of wheat husk and rice husk using ball milling including stainless steel milling media comprises 1.54 grams of rice husk;
   wherein the step of preparing powders of ZnO using ball milling including stainless steel milling media comprises 0.20 grams of ZnO; and
   wherein the steps of heating the pellets at a temperature above 1400° C. and forming nanostructured zinc silicate pellets of 50-100 nm comprises forming pellets of 1 gram of homogenous nanostructured $Zn_2SiO_4$.

* * * * *